United States Patent [19]

Cho et al.

[11] 4,278,597

[45] Jul. 14, 1981

[54] PROTEIN ISOLATE HAVING LOW SOLUBILITY CHARACTERISTICS AND PROCESS FOR PRODUCING SAME

[75] Inventors: Iue C. Cho; Christopher W. Frederiksen, both of St. Louis; Ralph A. Hoer, Ballwin, all of Mo.

[73] Assignee: Ralston Purina Company, St. Louis, Mo.

[21] Appl. No.: 158,191

[22] Filed: Jun. 11, 1980

[51] Int. Cl.³ .............................................. A23J 3/00
[52] U.S. Cl. ................................ 260/123.5; 426/656; 426/459; 426/509; 426/520
[58] Field of Search ............... 426/634, 656, 506, 520, 426/459, 509; 260/123.5

[56] References Cited

U.S. PATENT DOCUMENTS

| | | | |
|---|---|---|---|
| 3,917,877 | 11/1975 | Kumar et al. | 426/656 |
| 4,054,679 | 10/1977 | Melcer et al. | 426/656 |
| 4,113,716 | 9/1978 | Gomi et al. | 426/656 X |
| 4,147,810 | 4/1979 | Kellor | 426/656 X |
| 4,178,391 | 12/1979 | Chao et al. | 426/656 X |
| 4,186,218 | 1/1980 | Gomi et al. | 426/656 X |

*Primary Examiner*—Robert A. Yoncoskie
*Attorney, Agent, or Firm*—Virgil B. Hill

[57] ABSTRACT

The present invention provides a process for the production of a protein isolate having low solubility with excellent functional properties as a complete or partial replacement for milk co-precipitate in a non-aqueous, "creme" filling used in cookies, snacks and the like. The process comprises; forming an aqueous slurry of an isolated soy protein; controlling the pH of the slurry to between about 4.5 to 5.8 by the addition of a monovalent alkali reagent; heating said slurry to a temperature of between about 170°–240° F.; and neutralizing said slurry to a pH of 6.8 to 7.2 in the presence of an alkaline earth cation to provide a low solubility protein isolate.

20 Claims, No Drawings

PROTEIN ISOLATE HAVING LOW SOLUBILITY CHARACTERISTICS AND PROCESS FOR PRODUCING SAME

BACKGROUND OF THE INVENTION

This invention relates to a low solubility vegetable protein isolate and a process for producing the same.

Vegetable protein isolates, especially soy protein isolates have found a wide degree of utility as food ingredients. Typically, soy isolates are produced by processes which provide products with a relatively high nitrogen solubility index (NSI). Isolates with high NSI values generally have good dispersibility characteristics in aqueous systems and are preferred in food products where the protein isolate must also have a certain degree of functionality in the food product in addition to simply providing a source of protein. Functionality refers to the ability of the protein isolate to contribute to or interact with other ingredients of the food product in order to improve or maintain the desired chemical or physical characteristics in the food product. An example of this would be the addition of a protein isolate to an emulsified meat system wherein the protein isolate serves as a "binder" for the moisture and fat thereby improving the physical properties or texture of the meat system besides increasing or maintaining the desired level of protein.

By contrast, there are certain food product applications of protein isolates where a high degree of solubility is not desirable. An example of this is a non-aqueous, "creme" filling of the type normally found in cookies or snacks. These fillings usually comprise a mixture of a milk co-precipitate, shortening and sugar. The filling must be very spreadable, yet retain its softness for a prolonged period of time. The use of a highly soluble protein isolate or one having a relatively high NSI results in the formation of a very hard and brittle filling when used as a replacement for a portion of the milk protein. Why this is the case is not completely understood, however, if a low solubility isolate or one having a low NSI value is employed, the filling material is usually much better with desirable softness and spreadability. On the other hand, insolubility is not the sole criteria since if the protein becomes too insoluble, a "gritty" undesirable texture results in the filling. It would, therefore, be desirable if a protein isolate could be produced which has selective insolubility characteristics to provide a filling with the above properties.

It is, therefore, an object of the present invention to provide a low solubility protein isolate having the ability to function in a non-aqueous filling material.

It is also an object to provide a low solubility isolate having the physical ability to form a smooth, creamy, and spreadable filling.

It is an object to produce an isolate which will function in this fashion by a process that imparts selective insolubility characteristics to the isolate.

It is also an object to produce such an isolate by a process which is reliable and convenient to practice on a commercial basis.

SUMMARY OF THE INVENTION

These and other objects are achieved in the present invention by a process for producing a low solubility protein isolate, that functions quite well in a non-aqueous creme filling of the type noted above.

The low solubility protein isolate of the present invention having a nitrogen solubility index (NSI) below 20 is produced by a process comprising; forming an aqueous slurry of an isolated soy protein; controlling the pH of the slurry to between about 4.5 to 5.8 by the addition of a monovalent alkali reagent; heating said slurry to a temperature of between about 170°–240° F.; and neutralizing said slurry to a pH of 6.8 to 7.2 in the presence of an alkaline earth cation. The temperature range for heating of the slurry, the type of alkali used to adjust the pH prior to heating, and the stage of the process at which the alkaline earth cation is present in the heated slurry are all critical parameters which collectively provide the protein isolate with the desired degree of insolubility to serve as a partial or complete replacement for milk protein in products that require good softness, smoothness, and spreadability.

Certainly, the application of more heat to the slurry can also insolubilize the protein, however, even if the nitrogen solubility index is reduced to below 20 by the use of more heat, the protein tends to form a "gritty" texture in a non-aqueous "creme" filling. Likewise, if the alkaline earth is added prior to the application of heat, even when the slurry is heated to within the above temperature range, the addition of alkaline earth cation at this point in the process results in a filling which is also handicapped by a gritty texture.

Therefore, the above combination of steps and the order thereof, result in a protein isolate having a low nitrogen solubility index (NSI), which functions well in a non-aqueous creme type filling, providing such a product with good smoothness, spreadability and overall appearance. These functional characteristics are believed to be achieved by the selective degree and manner in which the protein source has been insolubilized.

DESCRIPTION OF THE PREFERRED EMBODIMENTS

The isolated soy protein employed as the starting material in the present process is obtained from whole soybeans in the following manner. The whole soybeans or vegetable protein material which form the starting material of the instant invention are preferably defatted and the oil is extracted to leave the soybean meal or flakes. More specifically, the soybeans may be crushed or ground and passed through a conventional oil expeller. However, it is preferable to remove the oil by solvent extraction techniques, using aliphatic hydrocarbons such as hexane, or azeotropes thereof, and these have been conventionally employed for this purpose. Following extraction to remove residual lipids and oil, vegetable protein flakes having a high degree of dispersibility are obtained.

Following grinding or treatment of the vegetable protein material, the resulting solids, which in the case of soybeans are commonly referred to as soybean flakes, contain many ingredients including complex proteins, sugars, fibers, and various other types of materials. Initially, these proteins and many of the soluble sugars are dissolved from the other constituents of the soybean meal including cellulosic fibers and the like. This is accomplished by placing the flakes in an aqueous bath to provide a mixture having a pH of at least about 6.5 and preferably between about 7.0 and 10.0. Typical alkaline reagents which may be employed if it is desired to elevate the pH above 6.5 include sodium hydroxide, potassium hydroxide, calcium hydroxide, or other commonly accepted food grade alkaline reagents and the present invention is not intended to be limited in this respect. A pH of above about 7.0 is generally preferred since an alkaline extraction facilitates solubilization of the protein, although the exact pH which may be employed should not be considered as limiting the present invention. Typically, the pH of the aqueous extract will be at least about 6.5 and preferably between about 7.0 to 10. The ratio by weight of the aqueous extractant to the vegetable protein material that is typically employed in the instant process is between about 5 to 20 to 1 and preferably is employed at a ratio of about 10:1.

It is also desirable in the process of the instant invention that an elevated temperature be employed during the aqueous extraction step to facilitate solubilization of the protein, although ambient temperatures are equally satisfactory if desired. The exact temperature which may be employed is not intended to limit the instant process for the isolation of protein, although the actual temperature of extraction may range from ambient up to 120° F. with a preferred temperature of 90° F. The period of time for extraction with the aqueous medium is further not intended to limit the present invention and a period of time between about 5 and 120 minutes may be conveniently employed with a preferred time of about 30 minutes.

Following extraction of the vegetable protein material, the aqueous extract of protein can preferably be stored in a holding tank or suitable container while a second extraction is performed on the insoluble or residual solids from the first aqueous extraction step. It is desirable to carry out a second aqueous extraction of the insoluble solids remaining after the first extraction step in order to remove any residual protein which may not have been removed during the initial extraction and thereby increase the efficiency and yield of the instant process. If so desired, however, this additional step may be completely avoided and one may proceed, if desired, immediately to the precipitation of the protein.

The insoluble solids from the first extraction is extracted with a second portion of an aqueous extractant to provide a second aqueous protein extract. The second extraction of the spent flakes or insoluble solids is carried out in a similar manner to the first extraction step at a pH of at least about about 6.5 or preferably between about 7.0 to 10.0. In the second extraction, however, it is preferred that a ratio by weight of extractant to the ground protein material is between about 4 to 15 to 1 and preferably is at a ratio of about 6:1. Otherwise, the conditions of the second extraction are essentially the same as that of the first extraction and following extraction, the second aqueous protein extract is separated from the residual material and combined with the first aqueous protein extract prior to the precipitation step which is hereafter described.

The combined aqueous protein extracts at a pH of at least 6.5 or preferably 7.0 to 10.0 are then precipitated by adjustment of the pH of the extracts to at or near the isoelectric point of the protein to thereby form an insoluble precipitate. This would typically be between about 4.0 and 5.0 and preferably between about 4.4 and 4.6. The precipitation step may be conveniently carried out with the addition of a common food grade acidic reagent typically such as acetic, sulfuric, phosphoric, hydrochloric acid, or with any other suitable acidic reagent. The isolated or precipitated soy protein is then formed into an aqueous slurry at a proteinaceous solids level of between about 4 to 25% by weight, preferably 10 to 20% by weight. The pH of the slurry is adjusted or controlled to a pH range of 4.5–5.8, preferably 5.0 to 5.7 by the addition of a food grade neutralizing reagent. Typically, such a reagent will be a monovalent alkali reagent such as an alkali metal hydroxide such as sodium or potassium hydroxide, or another hydroxide such as ammonium hydroxide. Alternatively, various other monovalent alkali reagents such as monovalent alkali carbonates and the like may be used. As noted, hereafter and as will be shown in the Examples, it is essential not to employ a divalent alkali such as calcium hydroxide and the like at this stage of the process, since the addition of this cation prior to heating results in undesirable textural properties in the isolate produced by such a process. Typically, the slurry is formed at room temperature or heated to about 70° F. to form a relatively uniform slurry.

Following formation of the slurry, the slurry is heated to a temperature of between about 170°–240° F., preferably 180°–200° F. The slurry can be heated by the injection of steam into the slurry by any suitable steam injection device or can be heated by an indirect heating drive such as a heat exchanger and the like wherein direct contact between the heating medium and the slurry is avoided. The particular means used to heat the slurry is not critical relative to the practice of the present invention.

Upon achieving the noted temperature, an alkaline earth cation is added to the slurry. The alkaline earth cation may be added directly to the heated slurry or alternatively the slurry may be cooled to 160° F. or so to minimize bacterial propagation followed by neutralization. As previously noted, it is important that the alkaline earth cation be added subsequent to heating of the slurry within the desired temperature range. If the alkaline earth cation is added prior to heating, the protein is insolubilized to an NSI value below 20, however, when used in the "creme" type filling a "gritty" texture is achieved, indicating perhaps that the protein has reacted with the cation in same fashion to provide a product that lacks the desired textural properties.

The addition of the alkaline earth cation can be carried out in several different ways. Since neutralization of the slurry to a pH of 6.8–7.2 takes place following heating, a preferred means of adding the required percentage of alkaline earth cation is simply to use an alkaline earth hydroxide such as calcium or magnesium hydroxide to adjust the pH of the slurry to within the desired range of 6.8–7.2. In this manner, the required level of alkaline earth cation of 0.25 to 1.0% by weight of the solids is achieved simultaneously with neutralization of the slurry. Alternatively, an alkaline earth cation such as $Mg^{++}$ or $Ca^{++}$ can be added in the form of a salt to achieve the desired level of 0.25 to 1.0% alkaline earth cation by weight of the solids in the slurry without a substantial change in the pH of the slurry, followed by neutralization to the pH range of 6.8–7.2 by the addition of any type of food grade neutralizing agent such as sodium or potassium hydroxide. The present invention is, therefore, not intended to be limited by the order in which alkaline earth cation addition or pH adjustment is carried out subsequent to heating.

Following neutralization of the slurry, the slurry or suspension is then dried to a powder having a moisture content of about 3–5% preferably by a flash drying process such as spray drying.

The dried product is a protein isolate of relatively low solubility having a nitrogen solubility index of below about 20. The product has unusual properties in the whole or partial replacement of milk co-precipitate in non-aqueous fillings for cookies, snacks and the like. As previously noted, such a filling must be smooth, soft, and spreadable and additionally must retain these properties upon storage. The above product provides the filling with this unique combination of properties.

To insure a complete understanding of the present invention, the following Examples are set forth to illustrate the process by which the product of the present invention is obtained, the criticality of certain steps in the process, and the unique properties of the product of the present invention in certain product applications.

EXAMPLE 1

An aqueous slurry of insolated soy protein was formed having a pH of 4.5 and a solids level of 17% by weight. The slurry was maintained at a temperature of 70° F. and the pH of the slurry was adjusted to 5.5 by the addition of sodium hydroxide.

Steam was injected into the slurry until the slurry reached a temperature of about 200° F. The slurry was held at the noted temperature for a period of 15 minutes. The heated slurry was homogenized at 2,000 psi and adjusted to a pH of 6.8 by the addition of 1.5% by weight of the total solids of calcium hydroxide. The slurry was spray dried to a moisture level of below about 3% by weight.

Analysis of the spray dried product showed the following average values.

| % Protein | % Moisture | NSI* |
|---|---|---|
| 89.6% | 2.49% | 9.7 |

*The nitrogen solubility index (NSI) values expressed herein are based on the following general test procedure.

A 10-gm. aliquot of the sample to be tested is added to a Waring Blendor cup having 200 ml. of distilled water.

The blended slurry is transferred quantitatively to a 400 ml. beaker, using small rinses when needed. The pH of the transferred slurry is adjusted, if necessary, to a pH of 6.7–6.9 with 1 N NaOH or 1 N HCI. The suspension is then stirred for 15 minutes at slow speed with care so as to avoid creating a vortex action or stirring in air. The slurry is diluted to 500 ml. with distilled water.

A 250 ml. aliquot is centrifuged, using a 250 ml. cup, for 10 minutes at 2,500 r.p.m. (1600×g).

A 50.0 ml. aliquot of supernatant free of suspended particles (if necessary, filter) is transferred to a Kjeldahl flask and the nitrogen content is determined by the Kjeldahl method. (A smaller aliquot may be used if the soluble nitrogen content is unusually high).

The percent by weight of soluble nitrogen of the sample is calculated based on 1/10 of the weight of the material initially used, as follows:

$$NSI = \frac{\text{Soluble nitrogen}}{\text{Total Nitrogen}} \times 100\%$$

To evaluate the effectiveness of the above isolate as a partial replacement for milk co-precipitate in creme type fillings, a sample of the above product was used in preparing such a filling, followed by an examination of the textural properties of the filling material.

The formula used in preparing the non-aqueous "creme" filling was as follows:

| Ingredient | % by weight |
|---|---|
| Isolated Soy Protein | 14.86% |
| Milk Co-precipitate | 14.86% |
| Shortening | 34.69% |
| Powdered Sugar | 35.59% |

The filling was prepared by forming a "creme" of the sugar and shortening by mixing for 3 minutes with a paddle type mixer. The temperature of the "creme" was raised to 80° F., with the isolated soy protein and milk co-precipitate being immediately added, followed by mixing for 3 minutes.

The filling was evaluated subjectively for spreadability and was determined to spread well. The filling had an overall satisfactory color and appearance with a smooth mouthfeel. The filling also had a softness which corresponds to a filling prepared with milk co-precipitate as the only proteinaceous ingredient. On a subjective evaluation scale of 1 to 3 with 1 being the very best and 3 having the poorest properties, the filling containing the isolated soy protein had a rating of 1.

EXAMPLE 2

To illustrate the importance of certain steps in the process of the present invention, the following products were prepared.

600 lbs. of isolated soy protein having a pH of about 4.5 was formed into an aqueous slurry at a temperature of 70° F. having a solids content of 20% by weight.

1.2% by weight of the solids of calcium hydroxide was added to adjust the pH of the slurry to 5.5.

Steam was injected into the slurry to heat the slurry to a temperature of 200° F. The slurry was held at this temperature for 15 minutes and then was split into two portions designated IA and IB.

Heated protein IA was neutralized to a pH of 6.8 with calcium hydroxide. Following neutralization the solids level was reduced to 16–17% by the addition of water and spray dried.

Heated portion IB was neutralized to a pH of 6.8 by using a 50% solution of sodium hydroxide. Following neutralization, the solids level was reduced to 16–17% by the addition of water and spray dried.

Another 600 lb. batch of isolated soy protein having a pH of about 4.5 was formed into an aqueous slurry having a solids content of 17% by weight and a temperature of 70%.

The pH of the slurry was adjusted to 5.5 by the addition of a 50% solution of sodium hydroxide. Steam was injected into the slurry to heat the slurry to a temperature of 200° F. The slurry was held at this temperature for 15 minutes, the solids level was reduced to about 15% by the addition of water and then was split into two portions designated IIA and IIB.

Heated portion IIA was neutralized to a pH of 7.0 by the addition of calcium hydroxide. Following neutralization, the slurry was spray dried.

Heated portion IIB was neutralized to a pH of 6.8 by the addition of a 50% solution of sodium hydroxide. Following neutralization, the slurry was spray dried.

Each of the products from Portions IA, IB, IIA, and IIB were subjected to the following proximate analyses set forth in Table I together with the various processing variables involved.

TABLE I

Proximate Analysis of Products

| Sample | Processing Variables | Moisture % | Protein % | NSI |
|---|---|---|---|---|
| IA | Before heat addition of $Ca^{++}$ Neutralized to pH 6.8 with $Ca^{++}$ | 4.38 | 88.8 | 3.5 |
| IB | Before heat addition of $Ca^{++}$ Neutralized to pH 6.8 with $Na^+$ | 4.0 | 89.3 | 5.7 |
| IIA | Before heat addition of $Na^+$ Neutralized to pH 6.8 with $Ca^{++}$ | 3.83 | 89.7 | 7.4 |
| IIB | Before heat additon of $Na^+$ Neutralized to pH 6.8 with $Na^+$ | 3.99 | 88.6 | 16.3 |

Each of the products from Runs IA, IB, IIA, and IIB were evaluated as a partial replacement for milk coprecipitate in a non-aqueous creme filling as set forth in Example 1 and these results are set forth in Table II.

TABLE II

Evaluation of Products in "Creme" Filling

| Sample | Spreadability | Mouthfeel | Overall Ranking* |
|---|---|---|---|
| IA | OK | Gritty | 3 |
| IB | OK | OK | 2 |
| IIA | OK | OK | 1 |
| IIB | OK | OK | 2 |

*Scale of 1 to 3 with 1 being best and 3 being poorest.

It may be seen from the above evaluation that the best filling was obtained from an isolate produced by a process which employed neutralization subsequent to heating with an alkaline earth hydroxide and avoided the use of an alkaline earth cation to adjust the pH prior to heating.

EXAMPLE 3

400 lb. of isolated soy protein having a pH of about 4.5 was formed into a slurry having 15% solids. The pH of the slurry was adjusted to 6.1 by the addition of a 50% solution of sodium hydroxide.

The slurry was heated by steam injection to a temperature of 305° F., followed by neutralization of the heated slurry with calcium hydroxide to a pH of 6.8. The neutralized slurry was spray dried to a powder having the following proximate analyses.

| Protein % | Moisture | NSI |
|---|---|---|
| 89.4 | 3.69% | 70.9 |

To evaluate the effectiveness of the above product in a non-aqueous "creme" type filling, such a product was prepared as set forth in Example 1. The filling was evaluated for textural properties as set forth in Table III.

TABLE III

| Spreadability | Mouthfeel | Overall Ranking* |
|---|---|---|
| Failed | Very dry | 3 |

*Scale of 1 to 3, with 1 being best and 3 being poorest.

It may be seen that when the temperature range for heating of the slurry prior to neutralization is exceeded that the isolate obtained has poor textural properties when employed in a non-aqueous creme filling.

EXAMPLE 4

An aqueous slurry of 200 lbs. isolated soy protein having a pH of 4.5 was formed having a solids level of 20% by weight. The slurry was maintained at a temperature of 70° F. and the pH of the slurry was adjusted to 5.5 with sodium hydroxide.

Steam was injected into the slurry until the slurry reached a temperature of about 200° F. The slurry was held at the noted temperature for a period of 15 minutes. The heated slurry was then neutralized by the addition of calcium hydroxide to a pH of 6.8. The slurry was then spray dried into a product having the following proximate analyses.

| Protein % | Moisture % | NSI |
|---|---|---|
| 88% | 4.39 | 5.2 |

The above product was evaluated in a non-aqueous "creme" type filling of the type set forth in Example 1. The filling was evaluated for the textural properties set forth in Table IV.

TABLE IV

| Spreadability | Mouthfeel | Overall Rating* |
|---|---|---|
| OK | OK | 1 |

*Scale of 1 to 3, with 1 being best and 3 being the poorest.

It may be seen that an isolate produced according to the critical parameters set forth in the present invention provided the desired textural properties in the non-aqueous filling which were not achieved when isolates not processed pursuant to the present invention were employed.

While the above Examples set forth specific embodiments of the present invention, it is to be understood that reasonable modifications or substitutions may be made without departing from the spirit or scope of the present invention.

What is claimed is:

1. A method of forming a soy protein isolate having a nitrogen solubility index (NSI) below about 20 comprising:
   (a) forming an aqueous slurry of isolated soy protein having a high degree of dispersibility;
   (b) controlling the pH of the slurry to between about 4.5 to 5.8 by the addition of a monovalent alkali reagent;
   (c) heating said slurry to a temperature of between about 170°–240° F. for a time sufficient to obtain said isolate with a NSI below about 20; and
   (d) neutralizing said slurry to a pH of 6.8 to 7.2 by adding an alkaline earth cation.

2. A method as set forth in claim 1 wherein said slurry is heated to a temperature of between about 170°–200° F.

3. A method as set forth in claim 2 wherein said slurry is heated to a temperature of between about 180°–200° F.

4. A method as set forth in claim 1 wherein said slurry is neutralized by adding between about 0.25 to 1.0% by weight of the solids level in said slurry of alkaline earth cation.

5. A method as set forth in claim 1 wherein the pH of the slurry is controlled to about 5.5 prior to heating.

6. A method as set forth in claim 1 wherein the monovalent alkali reagent is selected from the group consisting of alkali metal hydroxides, alkali metal carbonates, and ammonium hydroxide.

7. A method as set forth in claim 1 including the step of dewatering said slurry following neutralization thereof.

8. A method as set forth in claim 1 wherein the alkaline earth cation is selected from the group consisting of calcium and magnesium.

9. A method as set forth in claim 1 wherein the slurry has a solids level of between about 4 to 25% by weight.

10. A method of forming a soy protein isolate having a nitrogen solubility index (NSI) below about 20 comprising:
   (a) forming an aqueous slurry of isolated soy protein having a high degree of dispersibility;
   (b) controlling the pH of the slurry to between about 4.5 to 5.8 by the addition of an monovalent alkali reagent selected from the group consisting of alkali metal hydroxides, alkali metal carbonates, and ammonium hydroxide;
   (c) heating said slurry to a temperature of between about 170°-200° F. for a time sufficient to obtain said isolate with a NSI below about 20; and
   (d) neutralizing said slurry to a pH of 6.8 to 7.2 by adding an alkaline earth cation.

11. A method as set forth in claim 10 wherein said slurry is heated to a temperature of between about 180°-200° F.

12. A method as set forth in claim 10 wherein said slurry is neutralized by adding between about 0.25 to 1.0% by weight of the solids level in said slurry of alkaline earth cation.

13. A method as set forth in claim 10 wherein the pH of the slurry is controlled about 5.5 prior to heating.

14. A method as set forth in claim 10 including the steps of dewatering said slurry following neutralization thereof.

15. A method as set forth in claim 10 wherein the alkaline earth cation is selected from the group consisting of calcium and magnesium.

16. A method as set forth in claim 10 wherein the slurry has a solids level of between about 4 to 25% by weight.

17. A method of forming a soy protein isolate having a nitrogen solubility index (NSI) below about 20 comprising:
   (a) forming an aqueous slurry of isolated soy protein having a solids level of between about 4 to 25% by weight, said protein having a high degree of dispersibility;
   (b) controlling the pH of the slurry to between about 4.5 to 5.8 by the addition of a monovalent alkali reagent selected from the group consisting of alkali metal hydroxides, alkali metal carbonates, and ammonium hydroxide;
   (c) heating said slurry to a temperature of between about 170°-200° F. for a time sufficient to obtain said isolate with a NSI below about 20; and
   (d) neutralizing said slurry to a pH of 6.8 to 7.2 by adding between about 0.25 to 1.0% by weight of the solids of said slurry of an alkaline earth cation.

18. A method as set forth in claim 17 including the step of dewatering the slurry following neutralization.

19. A method as set forth in claim 17 wherein said slurry is heated to a temperature of between about 180°-200° F.

20. A method as set forth in claim 17 wherein the alkaline earth cation is selected from the group consisting of calcium and magnesium.

* * * * *